(12) United States Patent
Bilhete

(10) Patent No.: US 12,651,228 B2
(45) Date of Patent: Jun. 9, 2026

(54) ASSESSING WORKMANSHIP QUALITY OF NETWORK SYSTEM INSTALLATIONS IN THE FIELD

(71) Applicant: Ciena Corporation, Hanover, MD (US)

(72) Inventor: Philip Bilhete, Montreal (CA)

(73) Assignee: Ciena Corporation, Hanover, MD (US)

( * ) Notice: Subject to any disclaimer, the term of this patent is extended or adjusted under 35 U.S.C. 154(b) by 45 days.

(21) Appl. No.: 18/602,541

(22) Filed: Mar. 12, 2024

(65) Prior Publication Data

US 2025/0292186 A1      Sep. 18, 2025

(51) Int. Cl.
*G06Q 10/0639* (2023.01)
*G06T 7/00* (2017.01)

(52) U.S. Cl.
CPC ..... *G06Q 10/06398* (2013.01); *G06T 7/0002* (2013.01); *G06T 2207/20081* (2013.01)

(58) Field of Classification Search
CPC ..... G06Q 10/06398; G06F 30/20; G06F 8/61; G06F 8/63
See application file for complete search history.

(56) References Cited

U.S. PATENT DOCUMENTS

| | | | |
|---|---|---|---|
| 8,887,991 | B2 | 11/2014 | Htay et al. |
| 9,503,228 | B2 | 11/2016 | Subhedar et al. |
| 9,576,329 | B2 | 2/2017 | Frankel et al. |
| 9,614,743 | B2 | 4/2017 | Htay et al. |
| 9,628,340 | B2 | 4/2017 | Blair |

| | | | | |
|---|---|---|---|---|
| 10,254,487 | B2 * | 4/2019 | Huang | ................... G01M 11/33 |
| 10,438,207 | B2 | 10/2019 | Subhedar et al. | |
| 12,254,332 | B2 * | 3/2025 | Rajagopal | ............ G06V 20/647 |
| 2001/0032727 | A1 * | 10/2001 | Maynard | ............. G02B 6/4459 |
| | | | | 174/657 |
| 2015/0271043 | A1 | 9/2015 | Htay et al. | |

(Continued)

FOREIGN PATENT DOCUMENTS

| | | | | |
|---|---|---|---|---|
| KR | 20220108930 A | * | 8/2022 | ..... G06Q 10/063114 |

OTHER PUBLICATIONS

Wei Zhang, Changyu Chen, Huajun Chen, Gang Sun and Shuping Zhao. Application of Augmented Reality in Satellite Cable Network Assembly. 2019 IOP Conf. Ser.: Mater. Sci. Eng. 542 012034 (Year: 2019).*

(Continued)

*Primary Examiner* — Johnna R Loftis
(74) *Attorney, Agent, or Firm* — Baratta Law PLLC; Lawrence A. Baratta, Jr.

(57) ABSTRACT

Systems and methods of assessing the workmanship quality of network installations are described in the present disclosure. A process, according to one implementation, includes a step of enabling operation of a project management tool for assisting an installer during a field installation procedure at a network site. The process also includes a step of receiving an indication that the installer has completed a task during the field installation procedure, wherein the task is related to installing a set of one or more network components at the network site. In response to receiving the indication, the process includes a step of obtaining one or more images of the set of one or more network components. Then, the process includes a step of analyzing the one or more images to assess a quality of workmanship of the task.

20 Claims, 9 Drawing Sheets

(56)  References Cited

U.S. PATENT DOCUMENTS

| 2016/0090105 | A1 |  | 3/2016 | Neubecker et al. |  |
|---|---|---|---|---|---|
| 2016/0212623 | A1 |  | 7/2016 | Cote et al. |  |
| 2016/0380843 | A1 |  | 12/2016 | Duncan et al. |  |
| 2017/0082655 | A1 | * | 3/2017 | Rosenberg | G01R 1/0416 |
| 2017/0104635 | A1 |  | 4/2017 | Htay et al. |  |
| 2017/0205783 | A1 |  | 7/2017 | Tannenbaum et al. |  |
| 2019/0128743 | A1 |  | 5/2019 | Dingman et al. |  |
| 2019/0272497 | A1 |  | 9/2019 | Tingler et al. |  |
| 2019/0311552 | A1 |  | 10/2019 | Zhang et al. |  |
| 2019/0379589 | A1 |  | 12/2019 | Ryan et al. |  |
| 2020/0167734 | A1 |  | 5/2020 | Hoofard et al. |  |
| 2020/0175971 | A1 |  | 6/2020 | Arora et al. |  |
| 2021/0022027 | A1 |  | 1/2021 | Khoshgard |  |
| 2021/0027485 | A1 |  | 1/2021 | Zhang |  |
| 2021/0103759 | A1 |  | 4/2021 | Chai et al. |  |
| 2021/0160125 | A1 |  | 5/2021 | Cheng |  |
| 2021/0206515 | A1 |  | 7/2021 | Stefanowski et al. |  |
| 2021/0289573 | A1 | * | 9/2021 | Greene | H04B 17/318 |
| 2021/0345133 | A1 |  | 11/2021 | Li |  |
| 2023/0350704 | A1 | * | 11/2023 | Rajagopal | G06F 9/453 |
| 2024/0291711 | A1 | * | 8/2024 | Pancholi | H04L 41/0806 |
| 2025/0199831 | A1 | * | 6/2025 | Rajagopal | G06V 20/70 |

OTHER PUBLICATIONS

Manda, Jeevan Kumar, Augmented Reality (AR) Applications in Telecom Maintenance: Utilizing AR Technologies for Remote Maintenance and Troubleshooting in Telecom Infrastructure (Aug. 23, 2023). Available at SSRN: https://ssrn.com/abstract=5136767 or http://dx.doi.org/10.2139/ssrn.5136767 (Year: 2023).*

Misiak, P., Szempruch, D. (2022). Automated Quality Inspection of High Voltage Equipment Supported by Machine Learning and Computer Vision. In: Bramer, M., Stahl, F. (eds) Artificial Intelligence XXXIX. pp 211-222 SGAI-AI 2022. (Year: 2022).*

Cho, S.-H.; Lee, K.-T.; Kim, S.-H.; Kim, J.-H. Image Processing for Sustainable Remodeling: Introduction to Real-time Quality Inspection System of External Wall Insulation Works. Sustainability 2019, 11, 1081. (Year: 2019).*

* cited by examiner

40

42

44

46

48

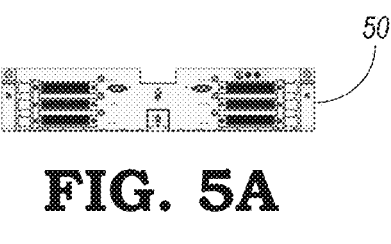
FIG. 5A
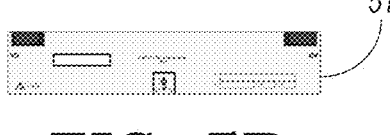
FIG. 5B
FIG. 5C
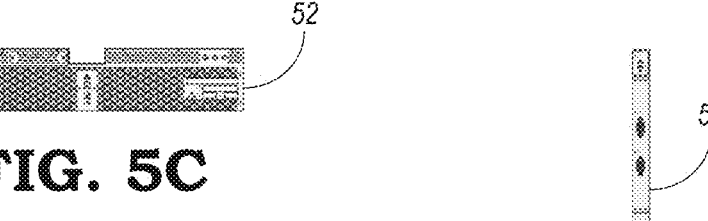
FIG. 5D
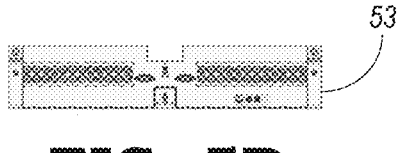
FIG. 5E
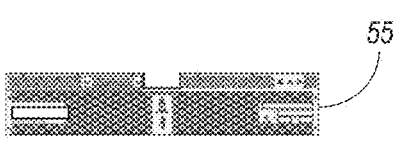
FIG. 5F
FIG. 5G
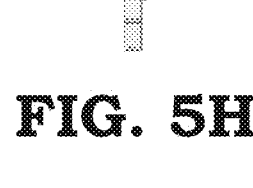
FIG. 5H
FIG. 5I

ASSESSING WORKMANSHIP QUALITY OF NETWORK SYSTEM INSTALLATIONS IN THE FIELD

FIELD OF THE DISCLOSURE

The present disclosure generally relates to network communications systems. More particularly, the present disclosure relates to systems and methods for assessing the workmanship quality of installers in the field during network installations.

BACKGROUND

In the field of telecommunications, network equipment is continually being upgraded and replaced at data centers and other locations. Also, as networks continue to grow, new network components are often added to keep up with demand. Of course, network installations require the deployment of installers and/or technicians to a network site to physically set up, replace, and/or configure various types of network equipment in the field. If it is determined at some point thereafter that the installation procedure was not conducted properly, then the installers or technicians will need to return to the network site to fix the issues, which can be a time-consuming and costly process. Therefore, there is a need in the field of network equipment installations to reduce these inefficiencies and other shortcomings in the conventional processes.

BRIEF SUMMARY

In various embodiments, the present disclosure includes 1) processes or methods having steps, 2) systems including at least one processor and memory with instructions that, when executed, cause the at least one processor to implement the steps, and/or 3) non-transitory computer-readable media having instructions stored thereon for programming at least one processor to perform the steps. According to one implementation, a process for assessing the workmanship quality of network component installations may include a step of enabling operation of a project management tool for assisting an installer during a field installation procedure at a network site. The process also includes a step of receiving an indication that the installer has completed a task during the field installation procedure, wherein the task is related to installing a set of one or more network components at the network site. In response to receiving the indication, the process includes a step of obtaining one or more images of the set of one or more network components. Also, the process includes a step of analyzing the one or more images to assess a quality of workmanship of the task.

According to some embodiments, the process may be configured whereby the step of analyzing the one or more images includes operation of a Machine Learning (ML) model. In response to assessing that the quality of workmanship is below an acceptable level, the process may further include a step of supplying feedback to the installer, substantially in real-time, to prompt the installer to make corrections with respect to the task.

The field installation procedure, for example, may be defined by a project plan that includes multiple tasks involving multiple sets of one or more network components. The multiple sets of one or more network components may include a) a first set of one or more shelves, cabinets, chassis, brackets, or frames, b) a second set of one or more network switches, network routers, network line systems, reconfigurable line systems, Reconfigurable Optical Add/Drop Multiplexers (ROADMs), network cards, modules, and network line amplifiers, c) a third set of one or more optical fiber cables, power cables, or network cables, and/or d) a fourth set of one or more labels or tags arranged with respect to the one or more optical fiber cables, power cables, or network cables. Furthermore, the multiple tasks may include a) assembling shelves, cabinets, chassis, brackets, or frames at the network site, b) mounting network equipment onto the shelves, cabinets, chassis, brackets, or frames, c) connecting optical fiber cables, power cables, or network cables to the network equipment, and/or d) labelling the optical fiber cables, power cables, or network cables. The step of assessing the quality of workmanship may include assessing the quality of workmanship of each of the multiple tasks by 1) confirming a correct type of each of the multiple sets of one or more network components, 2) ensuring a correct arrangement of network equipment on the shelves, cabinets, chassis, brackets, or frames, 3) ensuring a correct connection of each of the optical fiber cables, power cables, or network cables with respective ports of the network equipment, 4) verifying that the optical fiber cables, power cables, or network cables are not crimped, kinked, crushed, bent beyond an unacceptable radius, or damaged, and/or 5) using Optical Character Recognition (OCR) to determine if the optical fiber cables, power cables, or network cables are properly labelled.

In some embodiments, the one or more images may be obtained by an image capture mechanism associated with a mobile communication device used by the installer. For example, the image capture mechanism may be housed on a smartphone, a tablet, or augmented reality eyewear/headgear. The project management tool may include coordinating Application Programming Interface (API) modules on an installer device and a cloud server.

BRIEF DESCRIPTION OF THE DRAWINGS

The present disclosure is illustrated and described herein with reference to the various drawings, in which like reference numbers are used to denote like system components/method steps, as appropriate, and in which:

FIGS. 5A-5I are diagrams illustrating examples of network components to be installed on the shelves, cabinets, chassis, racks, etc. of FIGS. 4A-4D, according to various embodiments.

DETAILED DESCRIPTION

Figure 1:
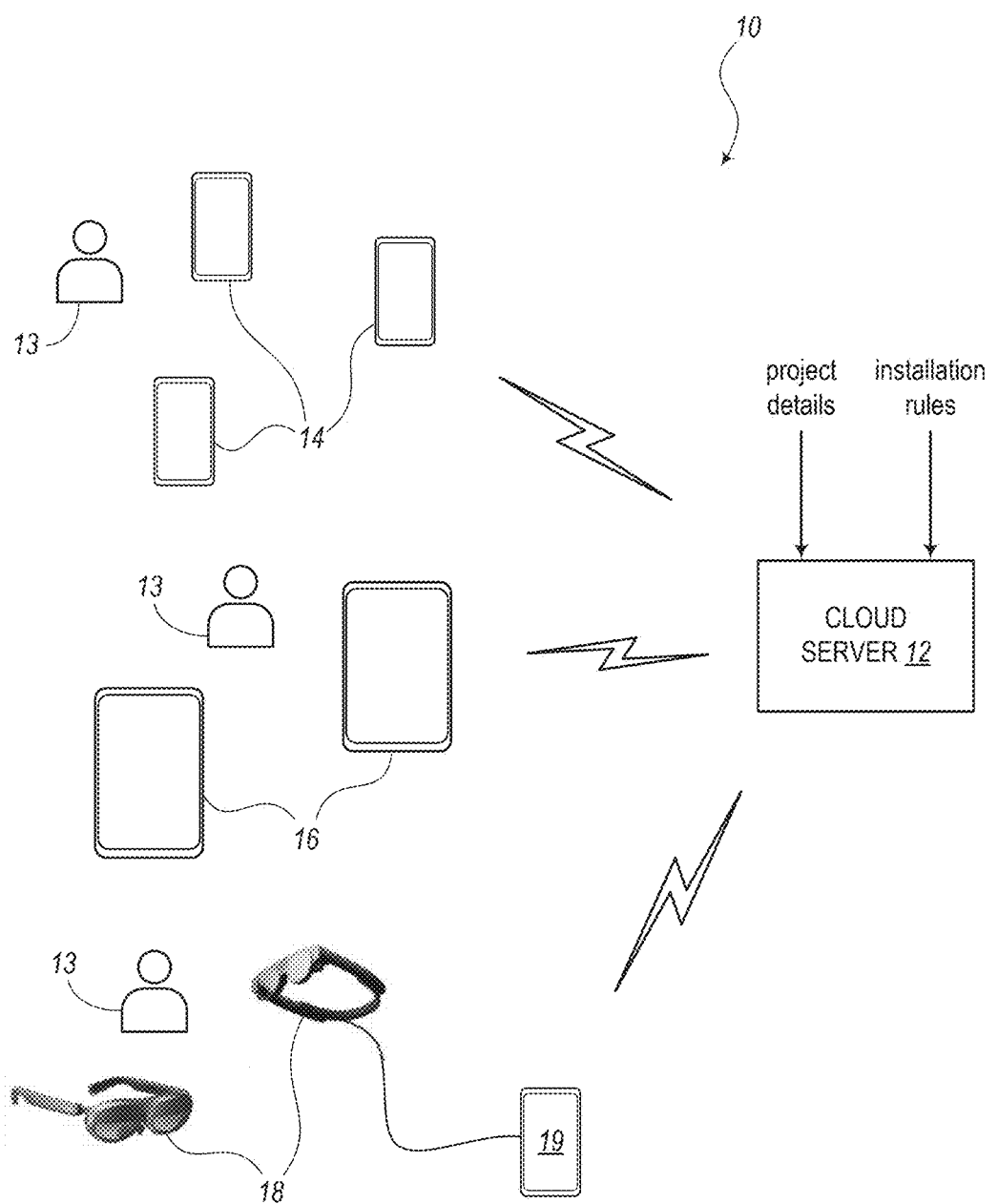
FIG. 1 is a diagram illustrating a system for assessing the workmanship quality of network installations, according to various embodiments.

In various embodiments, the present disclosure relates to systems and methods for assessing the workmanship quality of installers when they are deployed to various network sites to add, remove, replace, and/or install various network components. In particular, the systems and methods are configured to assess the quality of the workmanship while the installers are still present at the network site. For example, this may include the process of allowing the installers to capture images (e.g., still pictures, video, etc.) of the network equipment during installation. The captured images can be compared with predefined network design configurations, standards, installation rules, etc. This stage may include the operations of Machine Learning (ML) models to analyze images. If there are issues detected during installation, feedback can be provided in a substantially immediate manner in order that the installers can make corrections while they are present at the network site. Therefore, according to these systems and methods of the present disclosure, a network site can be set up and configured in a more timely manner and can be performed in a verifiable way. Also, this strategy is further configured to reduce the number of revisits needed to make corrections, because any issues can be resolved during the first installation.

Thus, installation workmanship quality can be evaluated immediately to ensure all installations are done properly. Also, the systems and methods enable uniformity (globally) regardless of the installers and locations. In some cases, quality auditors may be configured to work remotely (e.g., at a network monitoring location) to enforce and provide feedback to the installers when needed. In other cases, the audit may be performed automatically by ML systems and methods or other suitable evaluation systems. The audit process (e.g., manual, automatic, remote, etc.) can assess whether the installation was performed correctly and within certain installation workmanship quality standards and best practices. For example, a "build" stage of installation may include assembly of various products, whereby the system may perform an assessment as to whether the correct products are installed. Next, a "fibering" stage of installation may include connecting optical fiber cables to specific ports of the network components and properly labelling the cables for identification purposes, as well as power cables, network cables, and the like. Assessment of this stage may include determining whether the cables are connected to the proper ports according to predefined project details and installation rules and whether the labels (e.g., using Optical Character Recognition (OCR), etc.) are attached to properly identify the correct cables.

The systems and methods of the present disclosure are configured to utilize images captured by the installer while present at the installation site. The images are analyzed to recognize the installation of correctly identified components, recognize the correct installation practices, recognize the connection of cables to the correct ports, etc. Generally, standard pictures can be used as evidence that the workmanship standards are met. In some embodiments, the assessment of workmanship quality can be implemented in software or Application Programming Interface (API) components in installer hardware devices (e.g., mobile devices, smartphones, tablets, systems incorporating Augmented Reality (AR) eyewear/headgear, systems incorporating Virtual Reality (VR) eyewear/headgear, etc.) and/or a remote system (e.g., cloud server) that may be associated with a Network Monitoring System (NMS) or remote auditing expert. The workmanship quality assessment may be implemented as an extension in existing applications or as a freestanding app.

Some conventional systems may be configured to capture images and perform ML for various use cases related to an operating network element (e.g., inventory analysis, label classification, etc.). However, they do not focus on various problems associated with installation of new equipment, namely, to ensure installation is performed properly. Therefore, by addressing issues immediately according to the various embodiments of the present disclosure, the present systems and methods are able to overcome many of the shortcomings of the conventional systems. For example, the present disclosure describes systems and methods that are configured to decrease installation costs due to installer/technician re-visits. As such, feedback (as described herein) may be provided before the installer has left the site.

Also, this results in a reduced need to reschedule additional site visits to fix the issues. Furthermore, the systems and methods of the present disclosure are configured to reduce potential in-service delays that could result in customer revenue loss. The present systems are expected to increase customer satisfaction due to reducing delays in network operations. In addition, the present systems are configured to increase issue/fault detection while the installer is onsite, allowing the fixing of problems right away.

It has been noted that installers often (about 40% of the time) use the wrong label convention, as all customers tend to have their specific convention. This may include, for example, truncated characters, wrong port position, wrong information, etc., which may differ from preferred rules or conventions that may be used or suggested by network equipment providers or customers themselves. Implementing the systems and methods of the present disclosure is configured to ensure that essentially all of the installation projects are audited in a consistent and reliable way. Also, the tools described in the present disclosure are configured to integrate years of deployment experience by the Applicant to assist technicians to provide faster and more accurate turnups, by helping review equipment installation to minimize deployment errors, eliminate reverts, and stay on schedule. Hence, network equipment and installation companies can set up and configure customer networks more rapidly, more accurately, and with fewer maintenance windows.

Workmanship Quality Assessment System

FIG. 1 is a diagram illustrating an embodiment of a system 10 for assessing the workmanship quality of network installations. The system 10 includes a cloud server 12, which may be configured to receive project details about one or more installation projects at one or more network sites. The project details may include a list of equipment to be installed, schematics of how the equipment is to be connected, among other specifics. The cloud server 12 may also be configured to receive installation rules, which may include various standards and best practices for how network components are to be mounted, how optical fiber cables are configured to be connected to ports, how optical fiber cables are supposed to be wrapped or positioned to prevent damage, among other specifics, as well as power cables, network cables, or the like.

Also, the system 10 includes a number of installers 13 who may be deployed to perform various installation projects and tasks at various network sites. The installers 13 may use any suitable type of processing systems, such as mobile devices 14 (e.g., mobile phone, smartphones, cellular phones, etc.), computer tablets 16, and/or Augmented Reality (AR) or Virtual Reality (VR) equipment 18, such as eyewear or headgear for allowing the installer 13 to see additional information in the form of highlighting features, animation, visual indicators, etc. to assist the installer 13 with properly installing the network equipment. The AR/VR equipment 18 may be associated with another wireless communication device 19 for communicating with the cloud server 12.

In use, the installers 13 may receive installation instructions and guidelines from their respective user devices 14, 16, 18, 19. From the instructions, the installer 13 can construct components or put various parts of components together. Also, the installer 13 can mount certain components on other components and connect optical fiber cables, power cables, network cable, pluggables, and the like. After the completion of each task (or after completing a set of tasks), the installer 13 can give some type of indication (e.g., pressing a "completed" button, etc.) to the respective user device 14, 16, 18, 19. In some embodiments, the user devices 14, 16, 18, 19 and/or cloud server 12 can be configured to orchestrate the installation procedure while the installer 13 is at the specific network site.

At this point, the installation procedure may instruct the installer 13 to capture images related to the task or tasks that he or she has just completed. For example, if the task is to mount a network router to a certain rack location on a particular shelf, the captured images may include some indicators identifying the particular rack location and shelf and other indicators for identifying the specific network router. Also, the captured images may include mounting hardware (e.g., screws, nuts, bolts, supports, etc.).

Next, analysis techniques or algorithms (e.g., ML models) may be used (e.g., with respect to the user devices 14, 16, 18, 19 and/or cloud server 12) to determine if the images match the intended network design specifics. If it can be confirmed that the task has been successfully completed without any apparent errors, then the installer 13 can be instructed to proceed to the next task, if any. Otherwise, if there are any detected errors, feedback can be provided to the installer 13 to make appropriate corrections. For example, if an optical fiber cable is connected to the wrong port (according to the specific network design blueprint), then a suitable indication can be provided to the installer 13 to directing the installer's focus to the issues or instructing the installer 13 how to correct the issues. This can also apply to power cables, network cables (e.g., Ethernet), and the like.

Processing Systems

Figure 2:
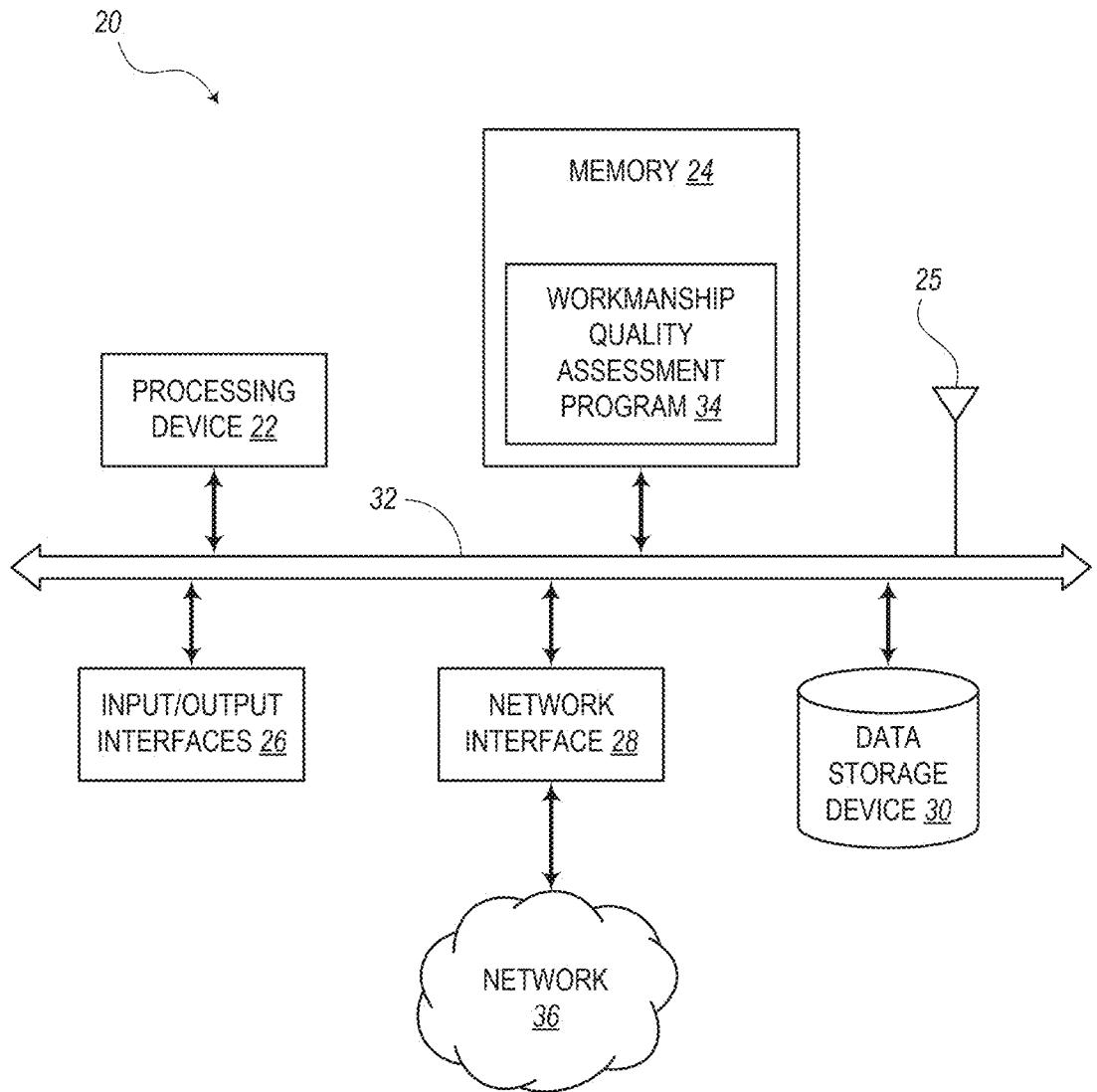
FIG. 2 is a block diagram illustrating a processing system of the cloud server or installer devices shown in FIG. 1, according to various embodiments.

FIG. 2 is a block diagram illustrating an embodiment of a processing system 20 associated with the cloud server 12 and/or the installer devices 14, 16, 18, 19 shown in the system 10 of FIG. 1. In the illustrated embodiment, the processing system 20 may be a digital computing device that generally includes a processing device 22, a memory 24, wireless communication device 25, Input/Output (I/O) interfaces 26, a network interface 28, and a data storage device 30. It should be appreciated that FIG. 2 depicts the processing system 20 in a simplified manner, where some embodiments may include additional components and suitably configured processing logic to support known or conventional operating features. The components (i.e., 22, 24, 25, 26, 28, 30) may be communicatively coupled via a local interface 32. The local interface 32 may include, for example, one or more buses or other wired or wireless connections. The local interface 32 may also include controllers, buffers, caches, drivers, repeaters, receivers, among other elements, to enable communication. Further, the local interface 32 may include address, control, and/or data connections to enable appropriate communications among the components 22, 24, 25, 26, 28, 30.

It should be appreciated that the processing device 22, according to some embodiments, may include or utilize one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), semiconductor-based devices, chips, and the like). The processing device 22 may also include or utilize stored program instructions (e.g., stored in hardware, software, and/or firmware) for control of the processing system 20 by executing the program instructions to implement some or all of the functions of the systems and methods described herein. Alternatively, some or all functions may be implemented by a state machine that may not necessarily include stored program instructions, may be implemented in one or more Application Specific Integrated Circuits (ASICs), and/or may include functions that can be implemented as custom logic or circuitry. Of course, a combination of the aforementioned approaches may be used. For some of the embodiments described herein, a corresponding device in hardware (and optionally with software, firmware, and combinations thereof) can be referred to as "circuitry" or "logic" that is "configured to" or "adapted to" perform a set of operations, steps, methods, processes, algorithms, functions, techniques, etc., on digital and/or analog signals as described herein with respect to various embodiments.

The memory 24 may include volatile memory elements (e.g., Random Access Memory (RAM), Dynamic RAM (DRAM), Synchronous DRAM (SDRAM), Static RAM (SRAM), and the like), nonvolatile memory elements (e.g., Read Only Memory (ROM), Programmable ROM (PROM), Erasable PROM (EPROM), Electrically-Erasable PROM (EEPROM), hard drive, tape, Compact Disc ROM (CD-ROM), and the like), or combinations thereof. Moreover, the memory 24 may incorporate electronic, magnetic, optical, and/or other types of storage media. The memory 24 may have a distributed architecture, where various components are situated remotely from one another, but can be accessed by the processing device 22.

The memory 24 may include a data store, database (e.g., data storage device 30), or the like, for storing data. In one example, the data store may be located internal to the processing system 20 and may include, for example, an internal hard drive connected to the local interface 32 in the processing system 20. Additionally, in another embodiment, the data store may be located external to the processing system 20 and may include, for example, an external hard drive connected to the Input/Output (I/O) interfaces 26 (e.g., SCSI or USB connection). In a further embodiment, the data store may be connected to the processing system 20 through a network and may include, for example, a network attached file server.

Software stored in the memory 24 may include one or more programs, each of which may include an ordered listing of executable instructions for implementing logical functions. The software in the memory 24 may also include a suitable Operating System (O/S) and one or more computer programs. The O/S essentially controls the execution of other computer programs, and provides scheduling, input/output control, file and data management, memory management, and communication control and related services. The computer programs may be configured to implement the various processes, algorithms, methods, techniques, etc. described herein.

Moreover, some embodiments may include non-transitory computer-readable media having instructions stored thereon for programming or enabling a computer, server, processor (e.g., processing device 22), circuit, appliance, device, etc. to perform functions as described herein. Examples of such non-transitory computer-readable medium may include a hard disk, an optical storage device, a magnetic storage device, a ROM, a PROM, an EPROM, an EEPROM, Flash memory, and the like. When stored in the non-transitory computer-readable medium, software can include instructions executable (e.g., by the processing device 22 or other suitable circuitry or logic). For example, when executed, the instructions may cause or enable the processing device 22 to perform a set of operations, steps, methods, processes, algorithms, functions, techniques, etc. as described herein according to various embodiments.

The methods, sequences, steps, techniques, and/or algorithms described in connection with the embodiments disclosed herein may be embodied directly in hardware, in software/firmware modules executed by a processor (e.g., processing device 22), or any suitable combination thereof. Software/firmware modules may reside in the memory 24, memory controllers, Double Data Rate (DDR) memory, RAM, flash memory, ROM, PROM, EPROM, EEPROM, registers, hard disks, removable disks, CD-ROMs, or any other suitable storage medium.

Those skilled in the pertinent art will appreciate that various embodiments may be described in terms of logical blocks, modules, circuits, algorithms, steps, and sequences of actions, which may be performed or otherwise controlled with a general purpose processor, a DSP, an ASIC, an FPGA, programmable logic devices, discrete gates, transistor logic, discrete hardware components, elements associated with a computing device, controller, state machine, or any suitable combination thereof designed to perform or otherwise control the functions described herein.

The I/O interfaces 26 may be used to receive user input from and/or for providing system output to one or more devices or components. For example, user input may be received via one or more of a keyboard, a keypad, a touchpad, a mouse, and/or other input receiving devices. System outputs may be provided via a display device, monitor, User Interface (UI), Graphical User Interface (GUI), a printer, and/or other user output devices. I/O interfaces 26 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI extended interface (PCI-X), a PCI Express interface (PCIe), an InfraRed (IR) interface, a Radio Frequency (RF) interface, and a Universal Serial Bus (USB) interface.

The network interface 28 may be used to enable the processing system 20 to communicate over a network, such as the network 36, the Internet, a Wide Area Network (WAN), a Local Area Network (LAN), and the like. The network interface 28 may include, for example, an Ethernet card or adapter (e.g., 10 BaseT, Fast Ethernet, Gigabit Ethernet, 10 GbE) or a Wireless LAN (WLAN) card or adapter (e.g., 802.11a/b/g/n/ac). The network interface 28 may include address, control, and/or data connections to enable appropriate communications on the network 36. The wireless communication device 25 may include a suitable radio equipment and may be configured to communicate wirelessly with the installer devices 14, 16, 19 to assess workmanship quality of installations at the various network sites where the installers 13 are performing various installation tasks.

The processing system 20 further includes a workmanship quality assessment program 34, which may be implemented in any suitable combination of hardware (e.g., in the processing device 22) and/or software/firmware (e.g., in memory 24). When implemented in memory, the workmanship quality assessment program 34 may be stored in non-transitory computer-readable media and may include logic instructions that enable or cause the processing device 22 to perform various actions related to the assessing of the various installations projects and ensuring that corrections can be made while the installer 13 is still deployed at the network site.

Network Equipment

Figure 3:
FIG. 3 is a table showing an example of field installation defects during a specific time period requiring additional attention.
Figure 4A:
FIGS. 4A-4D are diagrams illustrating examples of shelves, cabinets, chassis, racks, etc. to be installed at a network site, according to various embodiments.
Figure 4B:
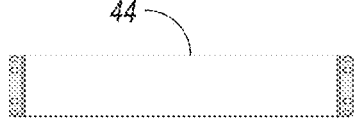
Figure 4C:
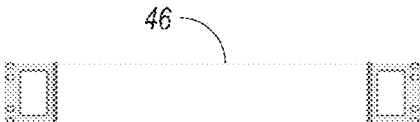
Figure 4D:
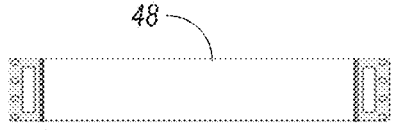

FIG. 3 is a table 40 showing an example of field installation defects that were discovered during a specific time period (i.e., YTD 2023). Of course, in order to get the network operating properly, the defects might normally require additional attention. However, it should be noted that operation of the systems and methods of the present disclosure are configured to reduce or even eliminate these defects after installation since any defects during installation are intended to be addressed while the installer is still on premises and can easily make corrections without being recalled to the site for resolving the issues.

FIGS. 4A-4D are diagrams illustrating examples of shelves, cabinets, chassis, racks, etc. to be installed at a network site. In some cases, the shelf 42 shown in FIG. 4A may already be installed at the network site (e.g., data center), and the installer 13 may need to install one or more rack elements 44, 46, 48 (shown in FIGS. 4B-4D) on the shelf 42. For example, one installation task may include building, setting up, constructing, and/or attaching various support pieces to create a skeleton on which additional network components can be connected.

FIGS. 5A-5I are diagrams illustrating examples of network components 50-58 to be installed on the shelves, cabinets, chassis, racks, rack elements, etc. 42, 44, 46, 48 of FIGS. 4A-4D. The network components 50-58 may include network switches, network routers, network line systems, reconfigurable line systems, Reconfigurable Optical Add/Drop Multiplexers (ROADMs), network cards, modules, network line amplifiers, etc. Some network components 50-55 (i.e., shown in FIGS. 5A-5F) may have flat orientation of "pizza box" appearance and may be attached to the shelves, cabinets, chassis, racks, brackets, modules, etc. Other network components 56-58 (i.e., shown in FIGS. 5G-5I) may have an upright orientation and supported by different types of bracket structures.

Figure 6A:
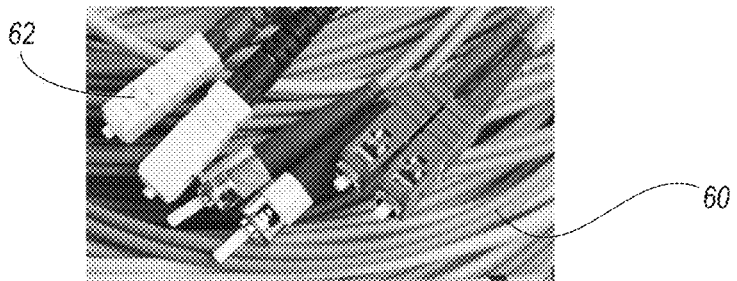
FIGS. 6A and 6B are diagrams illustrating examples of optical fiber cables, connectors, and pluggables for connection with ports on the network components shown in FIGS. 5A-5I, according to various embodiments.
Figure 6B:
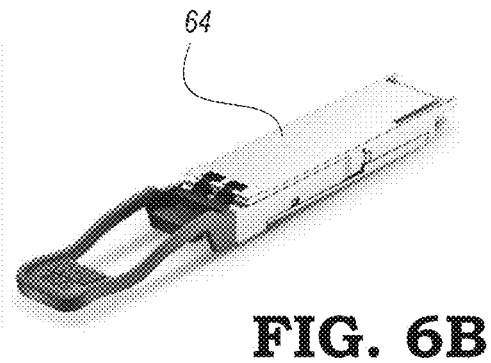
Figure 7:
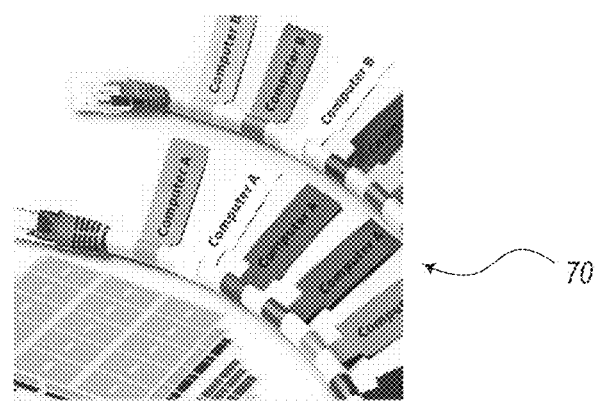
FIG. 7 is a diagram illustrating examples of labels or tags for labelling or identifying the optical fiber cables, connectors, and pluggables shown in FIGS. 6A and 6B, according to various embodiments.

FIGS. 6A and 6B are diagrams illustrating examples of optical fiber cables 60, connectors 62, and pluggables 64 for connection with ports on the network components 50-58 shown in FIGS. 5A-5I. FIG. 7 is a diagram illustrating examples of labels 70 or tags for labelling or identifying the optical fiber cables 60, connectors 62, and/or pluggables 64 shown in FIGS. 6A and 6B. Those skilled in the art will appreciate this can also apply to power cables, network cables, etc.

Operating Principles

The systems and methods of the present disclosure are configured to recognize field installation quality workmanship standards, which may be based on best practices, engineering principles, and quality collective knowledge. The products (e.g., shelves, cards, ports may be validated, including how fibers are connected, highlighting fiber deficiencies which may cause severe attenuation and/or loss of signal. Images may be processed and validated by software or API components and/or functionality associated with both the cloud server 12 and the installer devices 14, 16, 18, 19. The software or API components and/or functionality can analyze the images with respect to deployment best practices (or installation rules entered in the cloud server 12). In some embodiments, the functionality may use third party software (e.g., ML models) to evaluate the final installation pictures through an extension of an existing app or through new apps dedicated to assessing workmanship quality. Again, this can apply as well to power cables, network cables, etc.

The functionality for analyzing images may implement object recognition. For instance, object recognition can provide instant feedback to the installer 13 on whether the customer's installation was performed correctly and within preferred workmanship installation standards or expectations.

Each task of an installation can be evaluated using a set of images. In a "build" stage, where the components are assembled and mounted, images can be captured and used to determine if the build or assembly details meet acceptable criteria and project details. In a "fibering" stage, where optical fiber cables are connected to ports of various network components, images can be captured and used to determine if the connections meet acceptable criteria and project details. The fibering stage may also include respective labelling actions for properly identifying the cables. The labelling detection may capture images and use Optical Character Recognition (OCR) for interpreting whether the labels are proper.

The installer 13 would complete each stage (or task) of the installation process, which may be described in specific product documents provided by the manufacturer of the network equipment to ensure that installation is performed according to design. These documents may be entered in the cloud server 12 as installation rules and may be related to tasks to be completed. The installer 13 may select an image recognition step button integrated in the API or app, which may run ML operations against models provided by the manufacturer or other skilled authority regarding proper installation procedures.

Again, assessment may include recognizing the physical signatures of chassis and network cards and validating them against the provided engineering documentation. As an example, a rack front view and signal flow diagram may be used validation with respect to customer solutions. It is intended that validation would require successfully completing essentially all (100%) of a required set of tasks. This would also include fiber runs, fiber issues, etc. (e.g., exceeding fiber bend radius against accepted tolerances, etc.). The API may be configured to run on iOS or Android devices using the camera on the various mobile devices (e.g., installer devices 14, 16, 18, 19). The API may also be configured to run with applicable AR or VR eyewear 18 (e.g., Magic Leap, etc.) with appropriate modifications to the code as needed.

Thus, the systems and methods enable Real Time (RT) scan and processing involving RT streaming of scanned area for backend image recognition and validation of correct equipment installations, using ML models with respect to installation or workmanship rules for the build stage and fibering/labelling stage. The tool can be used by installers onsite to immediately verify work "real time" with respect to manufacturer's or service provider's quality standards, to immediately rectify problems both relative to the quality standards and to other engineering design of the work. As mentioned above, the RT feedback provides the benefit that installers 13 should normally not need to return to the site after successful completion of all tasks and verification of proper installation. This would thereby result in faster job completion, improved performance, and not requiring the installers to have special expertise.

The systems and methods that qualify the best-in-class global workmanship quality standards may be embedded in the workmanship quality assessment program 34 (e.g., any suitable software, firmware, third-party software, APIs, ML models, etc.) against predefined, approved models for 100% compliancy real time. The product installations may be assembled as described in technical documents as well as per engineered solutions provided to the customers. For example, this may include:

a) Assembling brackets to shelf product and/or shelf to provided frame or customer frame. Assembly is checked to ensure it complies with provided technical torque adjustments found in technical publications.

b) Installers should comply with anti-static regulations prior to performing any installations. This process is also described in technical publications.

c) All cable crimps are properly assembled (sheath, eyehole, gap, and crimp depressions) as described in technical documents.

d) Installer should follow specific wiring and fibering established convention, which may also be covered by technical publications, promoting easy removal of cards in case of failure without causing customer outages due random fibering routing that is not supported.

Fiber issues that exceed the bend radius can be detected. Also, unacceptable fiber damage (e.g., severe bending, kinked, crush, or cut fibers), which may cause signal loss, interference, or even fire hazards, can also be detected. These issues are raised for immediate remediation and are based on standards covered in various technical publications.

Physical attributes or signatures of shelves, cards, and other components (e.g., according to preparatory information and product pictures) may be related to product lines, which may then be compared to unique customer solutions covered by a specific Detailed Network Design (DND) (or project details applied to the cloud server 12). The comparison may allow for validation of 100% detection of "real time" detection against acceptable workmanship standards for all installations. The workmanship quality assessment program 34 may provide or access documents at the project level through an API. This enables a check between the design (DND) and the completed work at the customer site. This arrangement removes some of the need for installers to have specific expertise in network system designs, where installation companies can use workers with a lower skillset. There can be situations where there is a difference that is meaningless. For example, suppose a DND specifies for slot card A to be connected in slot X, but it is inserted in slot Y. However, suppose that, in this case, this connections works just as well. In this situation, instead of requesting that the installer 13 make corrections, the installation processes may include simply updating the DND, instead of changing the slot, where the DND may include options of either slot usage. Also, there can be rules which decide to prompt the installer 13 to update or which may prompt an update to the DND.

Fiber/cable labelling formats, which are then compared to the OCR (e.g., third party image to text converter), may be extracted from the actual labels and validated for 100% compliancy real time. Installers can work on many different sites for different customers. It has been noted, however, that the wrong labeling convention is often used. The systems and methods of the present disclosure, however, can remediate this problem immediately. Note, labelling can be a cumbersome task. Nevertheless, there may be a significant advantage to detecting and correcting early errors in this regard, instead of having to relabel fibers at a later time, after confusion can cost time and effort to a future worker. Also, this again can avoid the need for a site re-visit. Also, labelling can apply to other types of cables besides fibers, e.g., power cables, network cables, etc.

Visual alarm image validation against configured systems model can be used to validate 100% reliability of the product. System LED visual status can be validated with system images (i.e., what is the normal expect state of visual system LEDs when everything is normal after a specific customer installation is being done at a site). This can be compared against the system management GUI or tool. In one example, the system can compare visual system status and then compare them to the output of the system software GUI status throughout the shelf being installed or commissioned. This may provide suggestions when the LED visual status is not all green, which is expected at the shelf and network level when properly configured. It may be noted that quick visual confirmation can decrease trouble-shooting time.

Prior to the present disclosure, conventional systems may allow the installer to take one or more pictures and send them to a quality team for inspection and validation. However, with the aspects described in the present disclosure, there may be no need (or less of a need) for the quality team to inspect. Instead, in some implementations, the quality assessment may be performed automatically by ML or other techniques.

Process Flow

The following steps and sub-steps may be part of the various implementations of the present disclosure:

1. The installer 13 opens the mobile app on their mobile device 14, 19 or tablet 16 (e.g., Android phone, iPhone, etc.).
2. The app provides the installer 13 with a Project Number.
3. From the Project Number, the installer 13 opens the Site with respect to the installation.
4. From the Site, the installer 13 opens the Scope of Work.

5. The installer 13 views a checklist having a list of tasks. The site Bill of Materials (BOM) may contain serialized numbers (e.g., part numbers) provided by the manufacturer or supplier. Configuration information (e.g., positions of cards, etc.) may be derived from diagrams related to the installation (e.g., as shown in FIGS. 4B-4D and FIGS. 5A-5I). A checklist may be presented with a list of tasks to be completed per site.
6. The Scope of Work screen will have a task that says, "Scan Product."
7. The installer 13 selects "Scan Product" to begin the scan (e.g., using the third party API). The installer can point or aim an image capture mechanism (e.g., camera, video recording device, AR eyewear 18, etc.) at the installation portion just completed (e.g., frame, shelf, card, port, fiber, etc.), wherein the image capture mechanism can be part of the mobile device 14 or tablet 16 and/or may be connected to a mobile device 19. The API can validate installation issues in real time so installer 13 can fix and re-scan to confirm a quality pass. This step can be repeated until all installation issues are solved and fixed.
8. Using the API, the scanned image is analyzed to recognize what kind of shelf has been installed. Prior to the present disclosure, conventional systems may have required the installer to reference the BOM and PN and then cross-reference the installation documentation in order to validate products, cards, etc. The present disclosure allows the analysis of images to recognize the components. For example, the API may include:
   a) Allow the installer 13 to scan an image that indicates that the shelf is an RLS R2, R4, or R8 shelf.
   b) Analyze various combinations of cards and empty slots.
   c) When the type of shelf is detected, capture an image of the shelf and the bounding box that identifies the shelf.
9. The app will request confirmation if the shelf is not recognized as one that conforms to the expected design, such as R2, R4, or R8 shelves. For example, a 6500 Reconfigurable Line System (RLS) model has three models, using the R2 configuration (i.e., two-card slot shelf with common equipment), the R4 configuration (i.e., four-card slot shelf with common equipment), or the R8 configuration (i.e., eight-slot shelf with common equipment). The 6500 RLS shelves are compact, simple-to-deploy, photonic layer solutions that improve scalability, reduces footprint, and provides other benefits. The installer can select: "Yes, Go to Step 2—Scan Cards" or "No, Retry (x2)." After a second try, the API may switch to a manual approach to verify.
10. Once the installer 13 selects "Yes, Go to Step 2-Scan Cards" to acknowledge the shelf type, the app may be configured to perform the novel steps of:
    a) Categorize in the manufacturer database that it is R2, R4, or R8,
    b) Save the data in the database,
    c) Load the card detection model (and other models) specific to the RLS shelf (i.e., R2, R4, R8 shelves). This reduces the amount of time to identify and reduces the model's resource requirements.
    d) Save the image captured in Step 8c as photo evidence in the database that it is an R2 associated with the project number and task number.
11. The third party API will scan example the R2 shelf to identify cards:
    a) The R2 model will recognize which card is in which slot and return a list of (card number, slot number).

Multiple cards may look the same physically. To determine the subtle differences, the BOM will be used to certify the card type. Installer 13 will scan the part number and serial number from a bar code scan and API will compare with the BOM provided by the app.

b) This is a major differentiator that will ensure 100% that the configuration has been validated.

c) As cards are recognized in correct or incorrect slot, their image is automatically captured, and object coordinates are output.

12. The third party API will then scan the fibers and validate if the bend radius is acceptable, it will identify the defect to enable corrective action real time. At any time in the process, expecting the quality team to interject if image is a failure. Image could be a failure because it is a shadow or anomaly.

13. The app will guide the user or installer 13 on how to perform a required capture.

Use Case #1

This use case is based on novel steps that provide an improvement over conventional system. Prior to the present disclosure, installers were required to send a picture to a quality team to validate with supplied corrective actions based on the picture. The steps are configured to recognize a fully fibered shelf (customer solution) within a typical central office or remote sites:

1. Recognize the shelf type (physical signature)
2. Recognize the ports/card (physical signature) within a specific card
3. Recognize Fiber Optic Cables within a shelf and fiber guides against min acceptable radius tolerances. For instance, third party app can run tracing and discover min radius against provided product standards.
4. Recognize if a Fiber Optic Cable within a shelf is connected to a port or port should be empty and capped. This may include crosschecking with provided signal flow documentation (e.g., proprietary documentation).
5. Indicate to the installer 13 the ports (by ID) to which a fiber is connected and compare with signal flow documentation for validation.
6. Customer label, recognize if a label has the elements needed for correction to match the customer's label requirements (e.g., customer defined templates).
7. Recognize and identify specific fiber defects, such as fiber bends, damaged fiber sleeves and connectors not fully engaged within card ports. Again, in addition to fiber cables, this can also apply to power cables, network cables, etc.
8. Third party API would access scan image and compare them against expected physical product trained signatures using ML models for manufacturer requirements. Once an image is analyzed through the third party API, the images and evidence would be stored (e.g., in data storage device 30) of a server (e.g., cloud server 12). If the image is not recognized, auditors would provide details to enhance the Machine Learning (ML) to recognize future scans and further enhance the model used by the 3 party. The ML models are trained with installation and/or workmanship rules for various aspects, such as build stage, fibering, labeling, etc.

Sample Image Captures

FIGS. 8-16 show images that may be captured during installation sessions. The pictures may be examples of simulations based on the novel concepts described herein with respect to the present disclosure. The images may show, for example, how the signature of the shelves and cards are captured or discovered on the ML algorithms, which may be based on empty shelves and/or on different card slotting. Basically, the images may simulate ideal scenarios for slotting and recognizing shelves and/or cards.

Figure 8:
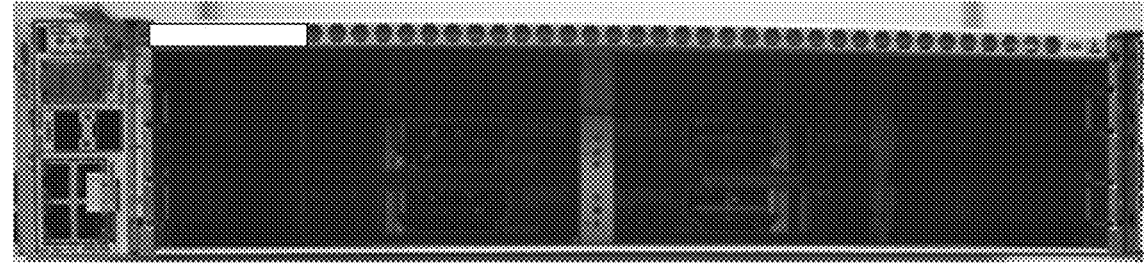
FIGS. 8-10 are examples of images captured during an installation procedure showing aspects of installed shelves, cabinets, chassis, racks, etc. and network components.
Figure 9:
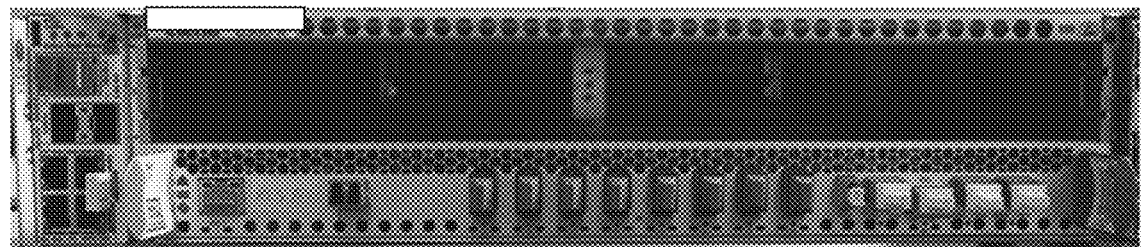
Figure 10:
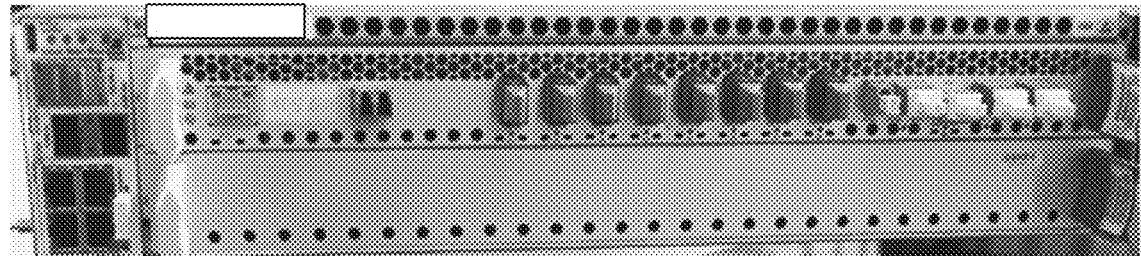

FIGS. 8-10 are examples of images captured during an installation procedure showing aspects of installed shelves, cabinets, chassis, racks, etc. and network components. FIG. 8 shows shelf attributes (e.g., physical signature of shelf type), such as an RLS two-slot shelf. FIG. 9 shows card attributes slotted within a shelf (e.g., physical signature of card type).

Figure 11:
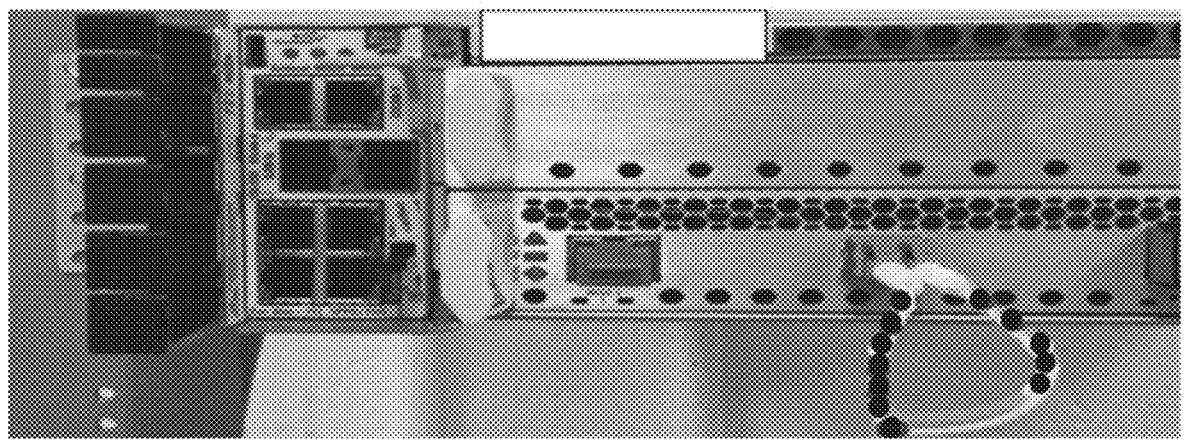
FIGS. 11-13 are examples of images captured during an installation procedure showing aspects of network components, ports of the network components, and optical fiber cables connected to the ports.
Figure 12:
Figure 13:
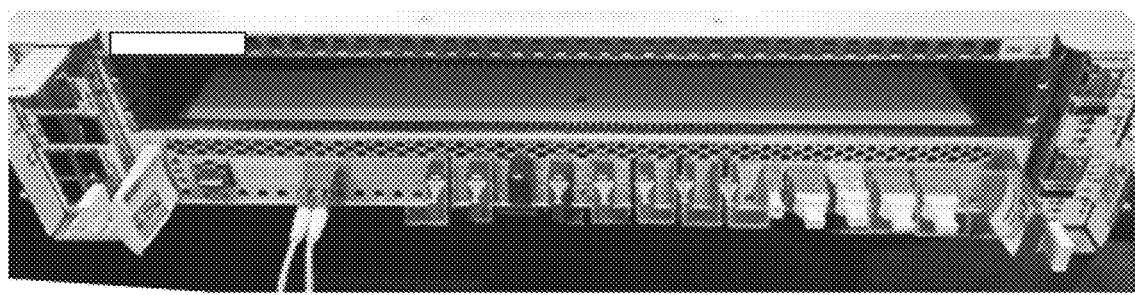

FIGS. 11-13 are examples of images captured during an installation procedure showing aspects of network components, ports of the network components, and optical fiber cables, power cables, or network cables connected to the ports. FIG. 11 shows how the app can recognize fiber optic minimum acceptable radius parameters. FIG. 12 shows how the app can recognize if an optical fiber cable within a shelf is connected to a port or if the port should be empty. Also, the app can recognize if an empty port is missing a dust cap, as would be appropriate in many situations. FIG. 13 shows how the app can compare with signal flow documentation for validation.

Figure 14:
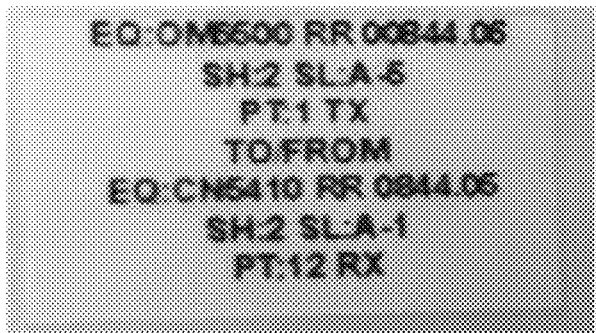
FIG. 14 is an example of an image captured during an installation procedure showing a customer label identifying network components and/or optical fiber cables, power cables, or network cables.
Figure 15:
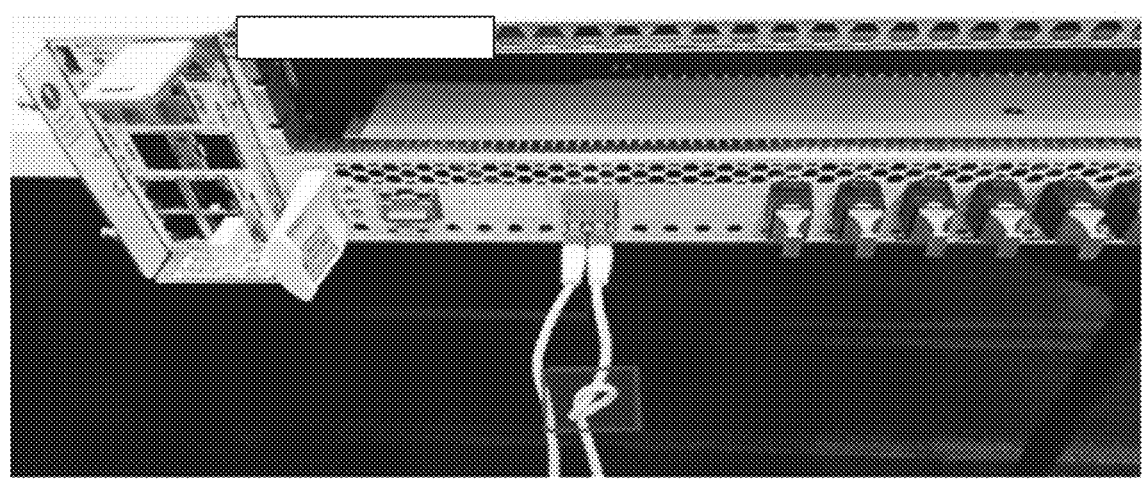
FIGS. 15 and 16 are examples of images captured during an installation procedure showing examples of issues of the installed optical fiber cables, power cables, or network cables.
Figure 16:
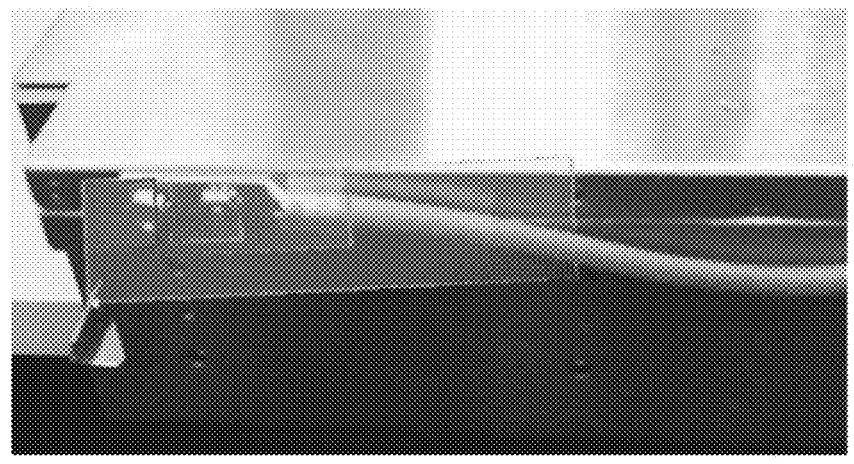

FIG. 14 is an example of an image captured during an installation procedure showing a customer label identifying network components and/or optical fiber cables. FIGS. 15 and 16 are examples of images captured during an installation procedure showing examples of issues of the installed optical fiber cables. FIG. 15 shows how the app can recognize and identify specific fiber defects (e.g., damaged fiber). FIG. 16 shows how the API can capture an image of a loose nut (e.g., discovered by its spacing), where recognition may be based on an ideal image of a properly torqued nut (e.g., where there is no spacing between the lug and the nut).

Use Case #2

This use case describes how the app (e.g., workmanship quality assessment program 34) can recognize and identify specific fiber defects. The installer 13 can scan the card ports to verify and validate that the fiber is properly installed. The third-party software (e.g., workmanship quality assessment program 34, API, etc.) is configured to run various code, AI, ML, etc. for executing functionality for detecting defects in installations. The processes are run to determine gaps between what is detected and correct models. In this case, such fiber cable connectors are detected as not being fully engaged within card ports.

The installer 13 would then run another scan to trace the fiber from card port to a fiber channel using the API. The API looks for physical damage, such as min radius, and may be configured to identify damaged fiber sleeves and connectors not fully engaged within card ports. The requirements, guidelines, and other parameters are provided to the models using best practices, including specific specifications documented in DNDs. The installer would then be guided by the app augmentation to move fiber or fibers (and/or change image capturing perspective) to help fiber detection and successfully identify fiber issues.

Use Case #3

This use case is related to visual product alarms and status. The API (e.g., workmanship quality assessment program 34) may use the scan image to validate visual alarms. For example, LEDs may be positioned on card and/or shelves and may be used to indicate various operating conditions. The API can compare them to the expected results/models. Alarm validation may then be confirmed by reading the shelf alarms through the product GUI via TL1 commands. For example, the API can detect a loss of signal situation, which may be generated from a potential misconnected port, or a hardware failure due to a software issue or card mismatch on an existing shelf slot.

The API can run ML against models with different LED statuses and confirm with shelf configurations to highlight issues which need to be addressed. In some embodiments, the shelf and card LEDs can reflect an operational (e.g., green) LED status, confirming the shelf/card functionally on the network.

This scan confirmation may ensure that the shelf is properly configured on the network in real time and can reduce a future site visit, which is normally done when there is a physical anomaly that needs to be addressed by installation tech (e.g., if there is a fiber misplaced or not engaged on a port and/or a card is not connected in the right slot or not properly slotted, etc.).

Workmanship Quality Assessment Process

Figure 17:
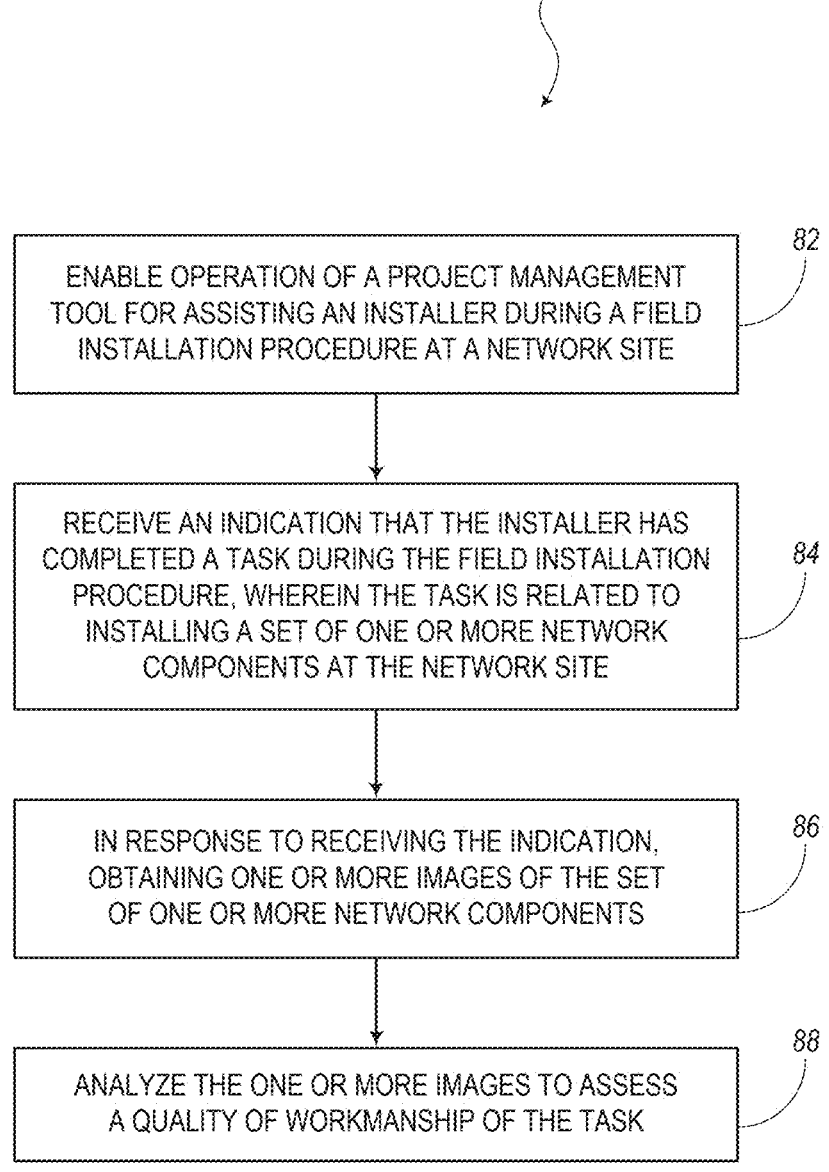
FIG. 17 is a flow diagram illustrating a method for assessing the workmanship quality of network component installations, according to various embodiments.

FIG. 17 is a flow diagram illustrating an embodiment of a process 80 for assessing the workmanship quality of network component installations. As shown in this embodiment, the process 80 includes a step of enabling operation of a project management tool for assisting an installer during a field installation procedure at a network site, as indicated in block 82. The process 80 also includes a step of receiving an indication that the installer has completed a task during the field installation procedure, wherein the task is related to installing a set of one or more network components at the network site, as indicated in block 84. In response to receiving the indication, the process 80 includes a step of obtaining one or more images of the set of one or more network components, as indicated in block 86. Also, the process 80 includes a step of analyzing the one or more images to assess a quality of workmanship of the task, as indicated in block 88. Note, the step of obtaining one or more images contemplates any approach with a mobile device, e.g., taking pictures, taking video, etc. for the obtaining, as well as a live feed for the providing. Also, video can be viewed as a sequence of images.

According to some embodiments, the process 80 may be configured whereby the step of analyzing the one or more images (block 88) includes operation of a Machine Learning (ML) model. In response to assessing that the quality of workmanship is below an acceptable level, the process 80 may further include a step of supplying feedback to the installer, substantially in real-time, to prompt the installer to make corrections with respect to the task.

The field installation procedure, for example, may be defined by a project plan that includes multiple tasks involving multiple sets of one or more network components. The multiple sets of one or more network components may include a) a first set of one or more shelves, cabinets, chassis, brackets, or frames, b) a second set of one or more network switches, network routers, network line systems, reconfigurable line systems, Reconfigurable Optical Add/Drop Multiplexers (ROADMs), network cards, modules, and network line amplifiers, c) a third set of one or more optical fiber cables, power cables, or network cables, and/or d) a fourth set of one or more labels or tags arranged with respect to the one or more optical fiber cables. Furthermore, the multiple tasks may include a) assembling shelves, cabinets, chassis, brackets, or frames at the network site, b) mounting network equipment onto the shelves, cabinets, chassis, brackets, or frames, c) connecting optical fiber cables, power cables, or network cables to the network equipment, and/or d) labelling the optical fiber cables, power cables, or network cables. The step of assessing the quality of workmanship (block 88) may include assessing the quality of workmanship of each of the multiple tasks by 1) confirming a correct type of each of the multiple sets of one or more network components, 2) ensuring a correct arrangement of network equipment on the shelves, cabinets, chassis, brackets, or frames, 3) ensuring a correct connection of each of the optical fiber cables, power cables, or network cables with respective ports of the network equipment, 4) verifying that the optical fiber cables, power cables, or network cables are not crimped, kinked, crushed, bent beyond an unacceptable radius, or damaged, and/or 5) using Optical Character Recognition (OCR) to determine if the optical fiber cables, power cables, or network cables are properly labelled.

In some embodiments, the one or more images may be obtained by an image capture mechanism associated with a mobile communication device used by the installer. For example, the image capture mechanism may be housed on a smartphone, a tablet, or augmented reality eyewear/headgear. The project management tool may include coordinating Application Programming Interface (API) modules on an installer device and a cloud server.

Benefits

The systems and methods of the present disclosure are configured to improve upon the conventional systems for assessing the quality of installations. For example, the present systems are configured to reduce site revisits with respect to deployment workmanship nonconformance at every site. Also, it is possible with the present systems to find and correct errors more easily, where such errors would normally affect product deployment. Thus, incomplete installation can be spotted immediately (or earlier than typical systems) to help keep the deployment cost down.

Users can complete repetitive tasks more quickly and efficiently, and with fewer mistakes using provided scripts and APIs. Also, the present disclosure is configured to enforce global installation workmanship) standards based on manufacturers' documentation and best practices. The present tools result in faster time to market for revenue generating services with fewer maintenance windows, improved accuracy, and standardized high-quality deployments. All products will benefit from image recognition.

Additional Considerations

The app (e.g., workmanship quality assessment program 34) may be configured to use various guidance for determining what tasks and checklists are associated with installation jobs or projects. This may include guide documentation, scope of work information, instructions, etc. regarding what the installer 13 is scheduled to do on a particular day at a particular network site (e.g., data center). The installer goes to the site and opens the API or app downloaded on the installer's device. The app is programmed to guide the installer 13 through the installation process with checklists, bullet instructions, related documentation, etc. This simplifies the process and allows the installer 13 to go through the list step by step, instructing the installer 13 what tasks to perform and when to perform them.

When a task or set of tasks are complete, the installer 13 may press a button on the app indicating that he or she has completed it. The cloud server 12 may record the actions, tasks, project numbers, and app usage to record the results of the installation project. The project management tool may be connected via a project management tool. Once the project comes from service automation, it is recorded as a project. Project management can open the projects and tasks and see the progress, since they are connected with the app via the cloud server 12. Once the projects, tasks, sites are illuminated in the project management tool, they can be synced to the workmanship quality assessment program 34 at the cloud server 12 and/or installer device 14, 16, 18, 19.

The installer 13 may only see what is provided on a GUI on the device, linked to the project management tool. The installers 13 follow the scope of work, completing every task: a) Build, b) Test, c) Integrate.

In one example, an installer 13 goes to a site, opens the app on his device (e.g., mobile phone 14), opens the particular project number for the particular site (e.g., Site A). He opens Site A (e.g., by clicking on Site A button) and a list of tasks are displayed on his phone. A first task, for example, may say, "Construct the shelf according to the blueprint." Upon completion, the installer 13 clicks on "Completed" and the app replies with, "Scan the shelf for quality." The installer 13 uses the camera on his phone to capture one or more pictures and enters the pictures into the app. Then, the app and/or the cloud server 12 analyze the pictures to determine whether this is the correct shelf and if it is constructed and installed correctly by comparing the pictures with ideal images of properly connected shelves. The app and cloud server 12 may recognize the shelf, recognize cards, recognize the ports, etc.

The images are cross-checked against documentation, project plans, network designs, etc. to ensure whether the installation is 100% correct. In a short time after the installer 13 enters the scanned images (e.g., less than a few seconds), the system replies back with an indication as to whether the installation is acceptable. The app may give a Pass or Fail indication, according to various worker standards. Suppose, for example, that the cards are not correctly slotted, but everything else might be fine. In this case, the app may visually highlight the component (e.g., on an image shown on a display of the installer device, superimposed on the component when viewed through AR glasses, etc.). Also, the app may provide textual guidance of the error (e.g., "Card ABC is not correctly slotted in Slot XYZ). Other issues may include a missing card, a port that should be unconnected having a connected fiber, a cable attached to the wrong port, the fiber arranged with a sharp angle or crimped, etc.

Thus, the image capture or scan step essentially shows what is visual to the naked eye. Suppose, for example, that it is inconclusive as to the quality of an installation from the captured images. In this case, the app may be configured to instruct the installer 13 to capture more images or use a different angle or different perspective. Then, the installer 13 can redo the images until the app can determine with certainty whether the installation is Pass or Fail.

The feedback to the user may be color-coded, whereby green indicates good installation, red indicates bad installation, and yellow indicates uncertain and needs more information for deciding. The app can instruct the installer 13 to retake pictures as needed and/or to make corrections to the installation if there are errors. With additional images (e.g., using AR glasses), the app can immediately provide feedback when it is determined that the installation task is completed satisfactorily. The display screen (or AR eyewear) can show camera features for helping the installer 13 as to where to focus, what images to capture, move to one side, capture images from a different perspective, higher, lower, to the left, to the right, etc.

According to some embodiments, an expert may be stationed at the cloud server 12 or other remote location and may provide input with respect to installation assessments. For example, when images are captured, ML models may not be able to make a definite decision about whether the task is correct. However, with involvement of an expert, he or she can also analyze the images and decide as to the quality of the installation. Also, they can further instruct the installer 13 through the tasks and for capturing additional images when needed. At this point, the quality expert can see whether there is a Pass or Fail condition and ask the installer 13 to redo tasks as needed. For instance, there may be situations where the lighting is insufficient to detect the quality. In this case, the expert may ask that the installer 13 shine a flashlight on the dim area or reduce shadows from his head or whatever. It may further be noted, however, that the ML model might be indecisive about a certain condition, but can then experience additional training when the expert determines how the condition should be interpreted. Then, the next time the same or similar condition is seen, the ML model can learn from the prior help of the expert and determine with certainty whether the installation is Pass or Fail. That is, the ML model can be one or more of i) pre-trained for rules for the quality of workmanship, and ii) trained during use based on the analyzing and feedback.

When the app indicates a Fail condition while the installer 13 is standing there at the site, the app can also provide various types of information to the installer 13 for properly indicating to his or her what the issue is and how to fix it. In other cases, the app may not have an adequate solution and can prompt an expert to get involved. Thus, the app can contact the expert, who can then call the installer 13 and provide clarification of installation instructions. Therefore, the installer 13 can get feedback automatically from the app, ML, cloud server 12, etc., plus can get feedback from a live expert who can access the captured images from a remote location (e.g., at the cloud server 12) and can lead the installer 13 through the process. This allows issues to be resolved immediately such that by the time the installer 13 leaves the site, the installation project has been completed and verified and believed (to the best of everyone's knowledge) to be 100% accurate.

CONCLUSION

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A non-transitory computer-readable medium configured to store a project management tool for assisting an installer during a field installation procedure at a network site, the project management tool having logic instructions which enable a processing device to perform steps of:

receiving an indication that the installer has completed a task during the field installation procedure, wherein the task is related to installing a set of one or more network components at the network site;

in response to receiving the indication, obtaining, via an image capture mechanism of a mobile communication device used by the installer, one or more images of the set of one or more network components; and analyzing the one or more images using a Machine Learning (ML) model, the analyzing comprising performing object recognition on the one or more images to identify at least one of a shelf, card, port, or cable of the set of one or more network components and to determine corresponding object coordinates, wherein performing object recognition further comprises outputting, for each identified shelf, card, port, or cable, a corresponding bounding region in at least one of the one or more images, the corresponding object coordinates being associated with the bounding region, comparing the identified shelf, card, port, and/or cable and the corresponding object coordinates to predefined project details and installation rules for the network site, and each of (i) confirming a correct type or arrangement of the one or more network components, (ii) verifying a correct connection of optical fiber cables, power cables, or network cables to respective ports of the one or more network components, (iii) detecting a crimped, kinked, crushed, bent, or otherwise damaged cable, and (iv) using Optical Character Recognition (OCR) to determine whether labels on the optical fiber cables, power cables, or network cables comply with a predetermined labelling convention, and in response to assessing that a workmanship quality is below an acceptable level, providing feedback to the installer, substantially in real-time, at the network site and prior to release of the installation task for sign-off, thereby enabling corrective action without requiring a subsequent site visit, wherein providing feedback comprises rendering, on a display of the mobile communication device, a visual overlay on at least one of the one or more images that highlights a nonconforming shelf, card, port, or cable based on the bounding region and identifies a corrective slot and/or port specified by the predefined project details.

2. The non-transitory computer-readable medium of claim 1, wherein, in response to analyzing the one or more images, the feedback includes a visual overlay on a live camera view that highlights, using the bounding box, a nonconforming shelf, card, port, or cable and displays an associated corrective instruction.

3. The non-transitory computer-readable medium of claim 1, wherein Machine Learning (ML) model is one or more of i) pre-trained for rules for the quality of workmanship, and ii) trained during use based on the analyzing and feedback.

4. The non-transitory computer-readable medium of claim 1, wherein the analyzing further comprises comparing a visual status of one or more light-emitting diodes (LEDs) on the network components captured in the one or more images with expected operational states defined in project documentation, and providing an indication to the installer when the visual status deviates from the expected operational states.

5. The non-transitory computer-readable medium of claim 1, wherein the field installation procedure is defined by a project plan that includes multiple tasks involving multiple sets of one or more network components.

6. The non-transitory computer-readable medium of claim 5, wherein the multiple sets of one or more network components include a) a first set of one or more shelves, cabinets, chassis, brackets, or frames, b) a second set of one or more network switches, network routers, network line systems, reconfigurable line systems, Reconfigurable Optical Add/Drop Multiplexers (ROADMs), network cards, modules, and network line amplifiers, c) a third set of one or more optical fiber cables, power cables, or network cables, and/or d) a fourth set of one or more labels or tags arranged with respect to the third set of one or more optical fiber cables, power cables, or network cables.

7. The non-transitory computer-readable medium of claim 5, wherein the multiple tasks include a) assembling shelves, cabinets, chassis, brackets, or frames at the network site, b) mounting network equipment onto the shelves, cabinets, chassis, brackets, or frames, c) connecting optical fiber cables, power cables, or network cables to the network equipment, and/or d) labelling the optical fiber cables, power cables, or network cables.

8. The non-transitory computer-readable medium of claim 7, wherein assessing the quality of workmanship includes assessing the quality of workmanship of each of the multiple tasks by 1) confirming a correct type of each of the multiple sets of one or more network components, 2) ensuring a correct arrangement of network equipment on the shelves, cabinets, chassis, brackets, or frames, 3) ensuring a correct connection of each of the optical fiber cables, power cables, or network cables with respective ports of the network equipment, 4) verifying that the optical fiber cables, power cables, or network cables are not crimped, kinked, crushed, bent beyond an unacceptable radius, or damaged, and/or 5)

using Optical Character Recognition (OCR) to determine if the optical fiber cables, power cables, or network cables are properly labelled.

9. The non-transitory computer-readable medium of claim 5, wherein the project plan further defines workmanship rules specifying acceptable bend radius tolerances for optical fiber cables, and wherein the analyzing includes detecting a violation of the bend radius tolerance based on the one or more images and providing corrective feedback to the installer in real-time.

10. The non-transitory computer-readable medium of claim 1, wherein the project management tool includes coordinating Application Programming Interface (API) modules on an installer device and a cloud server, the API modules being configured to synchronize captured images and analysis results with the cloud server for remote quality assurance auditing and feedback to train or update the Machine Learning (ML) model.

11. A method comprising steps of:
enabling operation of a project management tool for assisting an installer during a field installation procedure at a network site;
receiving an indication that the installer has completed a task during the field installation procedure, wherein the task is related to installing a set of one or more network components at the network site;
in response to receiving the indication, obtaining, via an image capture mechanism of a mobile communication device used by the installer, one or more images of the set of one or more network components; and
analyzing the one or more images using a Machine Learning (ML) model, the analyzing comprising
performing object recognition on the one or more images to identify at least one of a shelf, card, port, or cable of the set of one or more network components and to determine corresponding object coordinates, wherein performing object recognition further comprises outputting, for each identified shelf, card, port, or cable, a corresponding bounding region in at least one of the one or more images, the corresponding object coordinates being associated with the bounding region,
comparing the identified shelf, card, port, and/or cable and the corresponding object coordinates to predefined project details and installation rules for the network site, and each of (i) confirming a correct type or arrangement of the one or more network components, (ii) verifying a correct connection of optical fiber cables, power cables, or network cables to respective ports of the one or more network components, (iii) detecting a crimped, kinked, crushed, bent, or otherwise damaged cable, and (iv) using Optical Character Recognition (OCR) to determine whether labels on the optical fiber cables, power cables, or network cables comply with a predetermined labelling convention, and
in response to assessing that a workmanship quality is below an acceptable level, providing feedback to the installer, substantially in real-time, at the network site and prior to release of the installation task for sign-off, thereby enabling corrective action without requiring a subsequent site visit, wherein providing feedback comprises rendering, on a display of the mobile communication device, a visual overlay on at least one of the one or more images that highlights a nonconforming shelf, card, port, or cable based on the bounding region and identifies a corrective slot and/or port specified by the predefined project details.

12. The method of claim 11, wherein, in response to analyzing the one or more images, the feedback includes a visual overlay on a live camera view that highlights, using the bounding box, a nonconforming shelf, card, port, or cable and displays an associated corrective instruction.

13. The method of claim 11 wherein Machine Learning (ML) model is one or more of i) pre-trained for rules for the quality of workmanship, and ii) trained during use based on the analyzing and feedback.

14. The method of claim 11, further comprising comparing a visual status of one or more light-emitting diodes (LEDs) on the network components captured in the one or more images with expected operational states defined in project documentation, and providing an indication to the installer when the visual status deviates from the expected operational states.

15. The method of claim 11, wherein the field installation procedure is defined by a project plan that includes multiple tasks involving multiple sets of one or more network components.

16. The method of claim 15, wherein the multiple sets of one or more network components include a) a first set of one or more shelves, cabinets, chassis, brackets, or frames, b) a second set of one or more network switches, network routers, network line systems, reconfigurable line systems, Reconfigurable Optical Add/Drop Multiplexers (ROADMs), network cards, modules, and network line amplifiers, c) a third set of one or more optical fiber cables, power cables, or network cables, and/or d) a fourth set of one or more labels or tags arranged with respect to the third set of one or more optical fiber cables, power cables, or network cables.

17. The method of claim 15, wherein the multiple tasks include a) assembling shelves, cabinets, chassis, brackets, or frames at the network site, b) mounting network equipment onto the shelves, cabinets, chassis, brackets, or frames, c) connecting optical fiber cables, power cables, or network cables to the network equipment, and/or d) labelling the optical fiber cables, power cables, or network cables.

18. The method of claim 17, wherein assessing the quality of workmanship includes assessing the quality of workmanship of each of the multiple tasks by 1) confirming a correct type of each of the multiple sets of one or more network components, 2) ensuring a correct arrangement of network equipment on the shelves, cabinets, chassis, brackets, or frames, 3) ensuring a correct connection of each of the optical fiber cables, power cables, or network cables with respective ports of the network equipment, 4) verifying that the optical fiber cables are not crimped, kinked, crushed, bent beyond an unacceptable radius, or damaged, and/or 5) using Optical Character Recognition (OCR) to determine if the optical fiber cables, power cables, or network cables are properly labelled.

19. The method of claim 15, wherein the project plan further defines workmanship rules specifying acceptable bend radius tolerances for optical fiber cables, and wherein the analyzing includes detecting a violation of the bend radius tolerance based on the one or more images and providing corrective feedback to the installer in real-time.

20. The method of claim 11, wherein the project management tool includes coordinating Application Programming Interface (API) modules on an installer device and a cloud server, the API modules being configured to synchronize captured images and analysis results with the cloud server for remote quality assurance auditing and feedback to train or update the Machine Learning (ML) model.

* * * * *